United States Patent
Fernández Vázquez et al.

(10) Patent No.: US 12,214,966 B2
(45) Date of Patent: Feb. 4, 2025

(54) GLASS PRINTING MACHINE WITH CONTINUOUS TRANSPORT SYSTEM FOR THE GLASS

(71) Applicant: TECGLASS SL, Lalin (ES)

(72) Inventors: Juan Javier Fernández Vázquez, Lalin (ES); José Manuel Barros López, Lalin (ES)

(73) Assignee: TECGLASS SL, Lalin (ES)

(*) Notice: Subject to any disclaimer, the term of this patent is extended or adjusted under 35 U.S.C. 154(b) by 166 days.

(21) Appl. No.: 17/999,269

(22) PCT Filed: May 18, 2021

(86) PCT No.: PCT/ES2021/070355
§ 371 (c)(1),
(2) Date: Nov. 18, 2022

(87) PCT Pub. No.: WO2021/234203
PCT Pub. Date: Nov. 25, 2021

(65) Prior Publication Data
US 2023/0182485 A1 Jun. 15, 2023

(30) Foreign Application Priority Data
May 20, 2020 (ES) .............................. ES202030466

(51) Int. Cl.
*B65G 35/06* (2006.01)
*B41J 3/407* (2006.01)
(Continued)

(52) U.S. Cl.
CPC .............. *B65G 35/06* (2013.01); *B41J 3/407* (2013.01); *B41M 5/007* (2013.01); *B65G 49/064* (2013.01)

(58) Field of Classification Search
CPC . B41J 3/28; B41J 3/407; B41M 5/007; B65G 49/064; B65G 36/06
(Continued)

(56) References Cited

U.S. PATENT DOCUMENTS 3,677,393 A * 7/1972 Temple .................. A21C 15/00
198/465.1
4,185,812 A * 1/1980 Hall ...................... B23Q 7/1426
198/795
(Continued)

FOREIGN PATENT DOCUMENTS

DE 29602188 U1 4/1996
EP 3159174 A1 4/2017
(Continued)

OTHER PUBLICATIONS

International Search Report and Written Opinion mailed Aug. 16, 2022 in corresponding International Application No. PCT/ES2021/070355, translated, 14 pages.

*Primary Examiner* — James R Bidwell
(74) *Attorney, Agent, or Firm* — MH2 TECHNOLOGY LAW GROUP LLP

(57) ABSTRACT

Provided herein is a glass printing machine that comprises a loading station in which the glass to be printed is received, then a viewing or mechanical positioning system followed by a printing system, and finally an unloading station, with carriages running between an upper level along the above elements and returning to the starting point via a lower level. In some embodiments, the machine provided herein has a precision of less than 0.1 mm and allows the handling of large loads.

8 Claims, 5 Drawing Sheets

(51) Int. Cl.
*B41M 5/00* (2006.01)
*B65G 49/06* (2006.01)

(58) Field of Classification Search
USPC ...................................... 198/580, 795, 468.6
See application file for complete search history.

(56) References Cited

U.S. PATENT DOCUMENTS

| | | | |
|---|---|---|---|
| 6,502,691 B2 * | 1/2003 | Akatsuka | B65G 35/06 198/795 |
| 7,658,275 B2 * | 2/2010 | Hayashi | B61B 13/127 198/801 |
| 2003/0043246 A1 | 3/2003 | Codos | |
| 2017/0028731 A1 * | 2/2017 | Ko | B41J 2/16532 |
| 2020/0122456 A1 | 4/2020 | Vasquez et al. | |
| 2020/0215828 A1 * | 7/2020 | Watanabe | B41J 2/2117 |

FOREIGN PATENT DOCUMENTS

| | | | | |
|---|---|---|---|---|
| ES | 2537154 A1 | 6/2015 | | |
| ES | 2565692 A1 | 4/2016 | | |
| JP | 2006240911 A | 9/2006 | | |
| WO | WO-0068118 A1 * | 11/2000 | | B65G 35/06 |
| WO | 2009037753 A1 | 3/2009 | | |
| WO | 2014044714 A1 | 3/2014 | | |
| WO | 2015025020 A1 | 2/2015 | | |

\* cited by examiner

GLASS PRINTING MACHINE WITH CONTINUOUS TRANSPORT SYSTEM FOR THE GLASS

CROSS-REFERENCE TO RELATED APPLICATIONS

This application is a national stage entry under 35 U.S.C. § 371 of PCT Application No. PCT/ES2021/070355 entitled "GLASS PRINTING MACHINE WITH CONTINUOUS TRANSPORT SYSTEM FOR THE GLASS" filed May 18, 2021, which claims the benefit and priority of Spanish Application No. P202030466 filed May 20, 2020, the disclosures of which is are hereby incorporated herein by reference in their entireties.

OBJECT OF THE INVENTION

The object of the present invention, as stated in its title, is a glass printing machine with continuous glass transport comprising means for positioning with a precision of less than 0.1 mm.

The present invention is characterised by the special design and configuration of each and every element of a glass printing machine that combines the advantages of a rotary drive with the advantages of a drive based on linear technology. A system of glass transport carriages for digital printing is created, where the carriages move linearly in an "endless" or continuous system, so that the advantages of both systems are obtained:

Linear drive: precision, speed, and constant acceleration of the movement for a quality print.

Rotary drive: endless system, which provides in a small space a continuous advance of the product to be conveyed without interruptions, achieving an optimal working cycle.

Therefore, the present invention belongs to the field of ink printing systems.

BACKGROUND OF THE INVENTION

Machines with linear drives with limited loads and precisions are known in the state of the art, but none of the linear drives are used for glass printing.

On one hand, linear drives have a load limit of less than 20 Kg: on the other hand, the precision they achieve can be improved.

Moreover, in glass printing, due to the size of the product to be moved, i.e. the glass panes, the machine must turn the printing table 180°, which complicates the operation of the machine and also limits the dimensions of the machine itself and of the products to be moved.

Therefore, the aim of the present invention is to develop a printing machine or system that allows higher loads than those used hitherto, where the precision is higher than 0.1 mm and where the rotation of the printing table is solved, developing a machine such as the one described below, the essence of which is described in the first claim.

DESCRIPTION OF THE INVENTION

The object of the present invention is a glass printing system with continuous glass transport, i.e., there are no interruptions in the glass transport process.

The printing machine comprises a loading station where the glass to be printed is received, then a viewing or mechanical positioning system followed by a printing system, and finally an unloading station, with the carriages running between an upper level along the above elements and returning to the starting point via a lower level, the change of level at the loading and unloading station being carried out by means of vertical drives.

Preferably but not limited to, at the time of printing the carriages are transported with a drive that has an optical linear encoder with a resolution of less than 4 microns.

The vertical drive can be of any known type, either pneumatic, electric, or hydraulic. The carriages are each driven by a linear motor.

The carriages return to the starting point of the machine once they have moved to a lower level, driven by a system of belts, racks, spindles, pneumatic, that is totally independent of the linear movement of the upper level.

The number of carriages and linear motors to drive them will depend on the maximum length of glass to be processed and on the required cycle times.

Each carriage at the inlet of the machine is able to pick up a glass pane with the vertical movement, if available at the loading station.

Each carriage at the outlet of the machine is capable of leaving a glass with the vertical movement, if available at the unloading station.

Each carriage can have an integrated mechanical positioning system designed according to the geometric shape of the parts to be positioned.

Each carriage can be slotted to be integrated and coupled with a loading or unloading belt system for smooth transfer of the glass, or instead the carriage itself can have an integrated roller, belt, or band conveyor.

On the upper level, after the loading station, a vision system can be provided to know the position of each glass, thereby avoiding the installation of the mechanical system.

The installation of a mechanical positioning system or a vision system will depend on the type of glass of the customer and the positioning accuracy, the mechanical system being the most accurate.

The printing machine can be equipped with a cleaning station to clean the carriages after the painted glass has been deposited. In case ink has been spilled on the plane, so that the next glass is not stained.

Alternatively but not exclusively, supports can be placed on each plane, raised above the plane and with quick coupling to configure the machine according to the type of glass. In this way the glass does not touch the table, and the supports are always under the glass to avoid ink stains.

The logical thing to do would be to install either a carriage cleaning station or supports that raise the glass and prevent it from touching the table.

The use of cleaning rollers allows for greater automation of the process, but requires more maintenance and would make the machine more expensive.

The use of raised supports requires an adjustment when changing the type of glass.

The features described above allow a glass printing system with continuous transport to be obtained, with a precision of less than 0.1 mm and allows the handling of large loads, which to all intents and purposes is a major advance in the efficiency and versatility of the machine compared to machines of the state of the art.

Unless indicated otherwise, all the technical and scientific elements used in this specification have the meaning usually understood by a person skilled in the art to which this invention belongs. In the practice of this invention, procedures and materials similar or equivalent to those described in the report can be used.

In the description and claims, the word "comprises" and its variants do not intend to exclude other technical characteristics, additives, components or steps. For persons skilled in the art, other objects, advantages and characteristics of the invention will be partly inferred from the description and partly from the practice of the invention.

EXPLANATION OF THE FIGURES

In order to complement the description being made herein, and with the object of aiding the better understanding of the characteristics of the invention, in accordance with a preferred practical embodiment thereof, said description is accompanied, as an integral part thereof, by a set of drawings where, in an illustrative and non-limiting manner, the following has been represented.

PREFERRED EMBODIMENT OF THE INVENTION

In view of the figures, a preferred embodiment of the proposed invention is described below.

Figure 1:
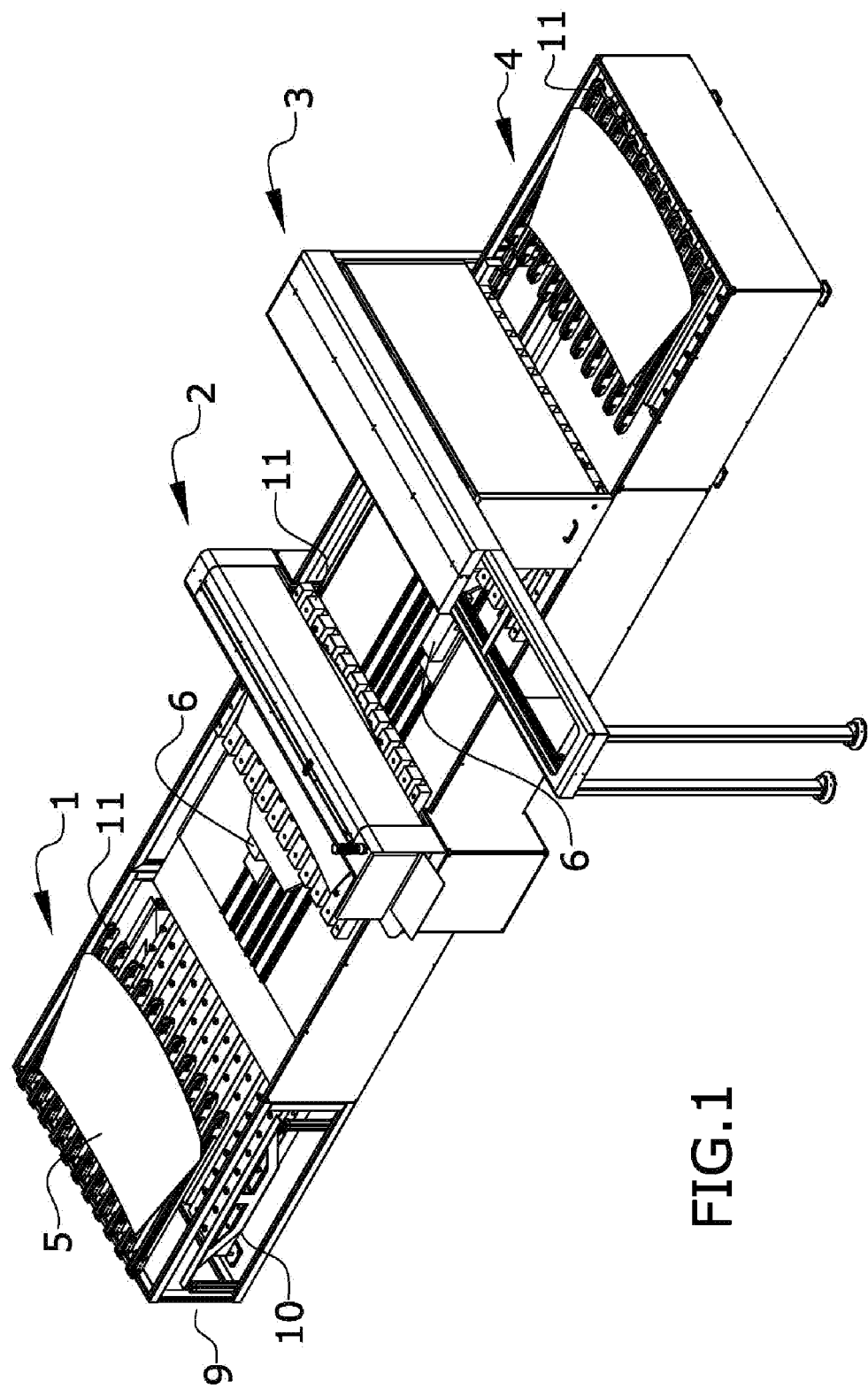
FIG. 1 shows a perspective view of the machine of the invention.
Figure 2:
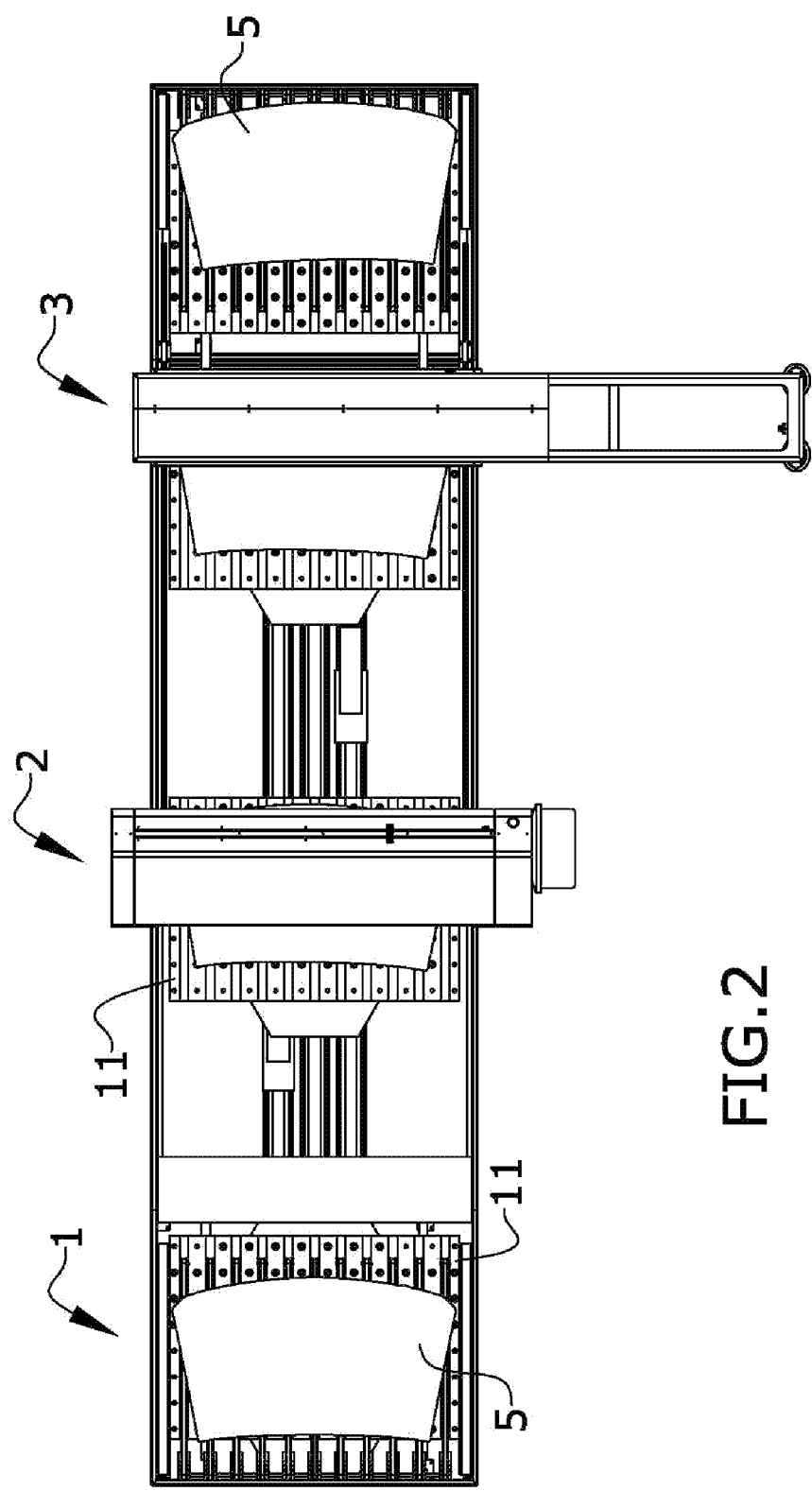
FIG. 2 shows a plan view of the printing machine of the invention.
Figure 3:
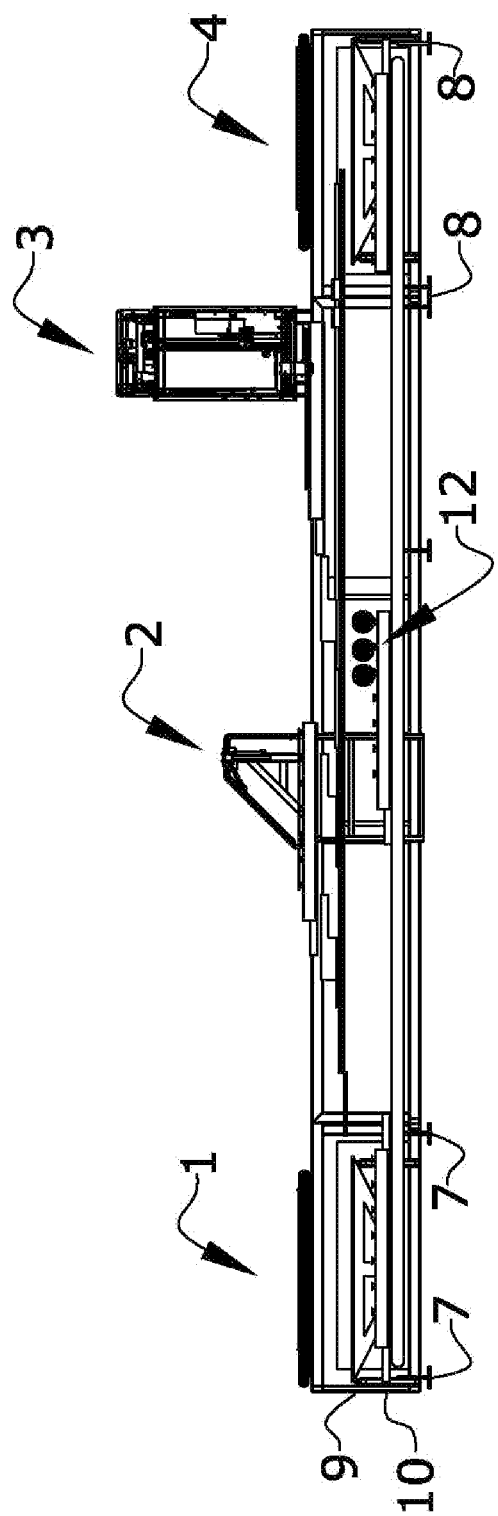
FIG. 3 shows a side view of the printing machine of the invention.

FIGS. 1 to 3 show that the machine comprises:
a loading station (1) receiving the glass panes to be printed
a viewing means (2) or a mechanical positioning system, preferably arranged downstream of the loading station
a printing bridge (3) preferably arranged downstream of the viewing means or mechanical positioning system
an unloading station (4) allowing the unloading of the printed glass panes where the machine comprises an upper level (9) disposed above a lower level (10), with a series of carriages (11) running continuously in one direction on the upper level (9) and in the opposite direction on the lower level (10); to achieve this change of direction, there is a first vertical drive (7) in the loading station (1) that raises the carriages (11) from the lower level (10) to the upper level (9) and a second vertical drive (8) in the unloading station (4) that lowers the carriages (11) from the upper level (9) to the lower level (10).

The first and second vertical drives (7) and (8) can be pneumatic, electric, or hydraulic, driven by linear motors (6).

On the first level the carriages (11) are driven by linear motors (6), where the number of carriages and linear motors will depend on the maximum length of the glass panes to be processed and the time required.

FIG. 3 shows that on the lower level there is a cleaning station (12) consisting of several rollers, such that when each carriage (11) passes by said cleaning station it is subjected to a cleaning process to remove any traces of paint that may have fallen on it and prevent it from staining other glass panes.

Figure 4:
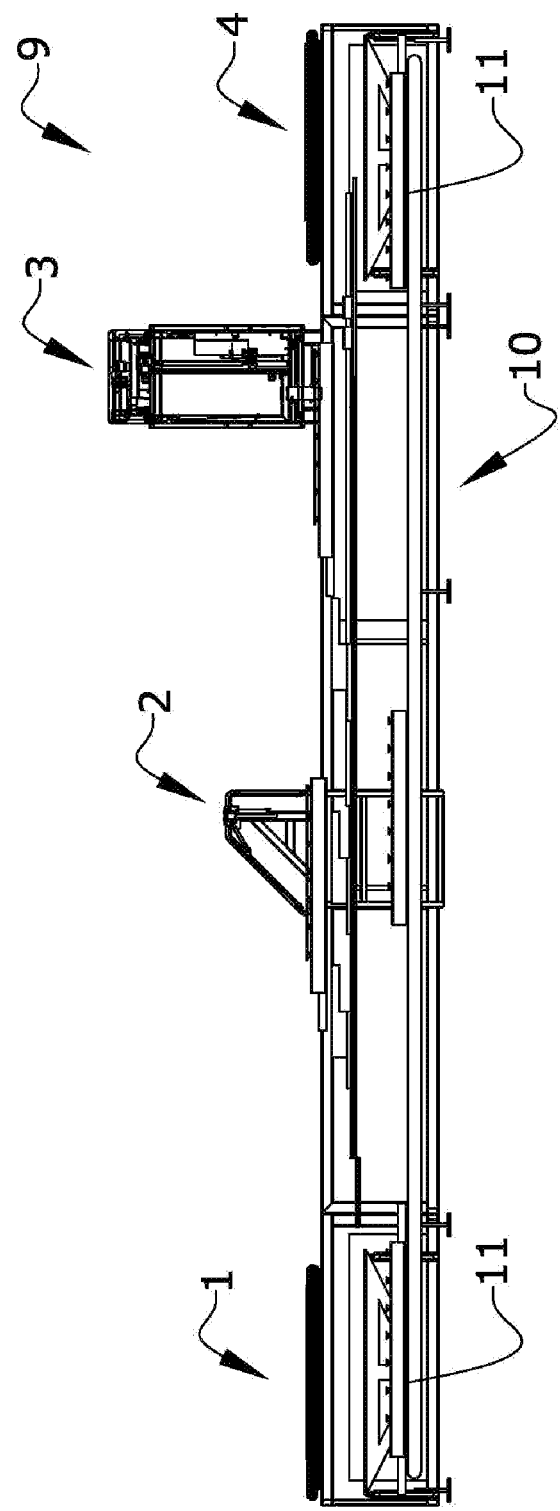
FIG. 4 shows a side view of the printing machine with the flow of carriages.

FIG. 4 shows schematically the flow of carriages (11) which, on the upper level (9) run from the loading station (1) to the unloading station (4), returning on a lower level (10) from the unloading station (4) to the loading station (1), changing levels by means of a first vertical drive (7) and a second vertical drive (8).

Figure 5:
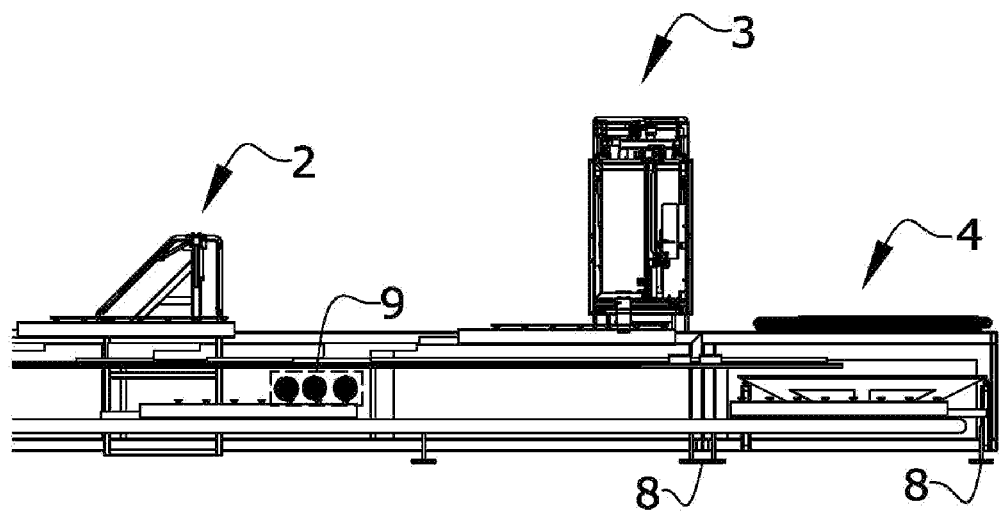
FIG. 5 shows an enlarged view of the side view of the machine showing the cleaning station.

FIG. 5 shows an enlarged view of the cleaning station (12) arranged on the lower level (10).

Figure 6:
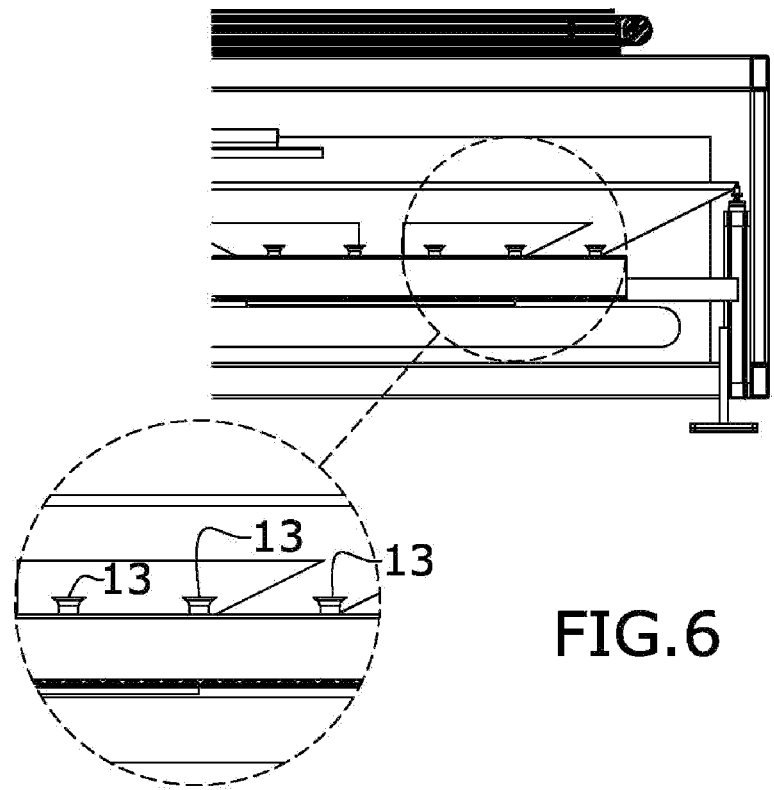
FIG. 6 shows an enlarged view of the raised supports used to prevent the glass from contacting the table.

FIG. 6 shows an alternative but not exclusive solution to the cleaning station (9), which consists of supports (13) raised above the lower level (10) and with quick coupling to prevent the glass from touching the table, so that the supports are always under the glass, thus avoiding ink stains.

Having sufficiently described the nature of the present invention, in addition to the manner in which to put it into practice, it is hereby stated that, in its essence, it may be put into practice in other embodiments that differ in detail from that indicated by way of example, and to which the protection equally applies, provided that its main principle is not altered, changed or modified.

The invention claimed is:

1. A glass printing machine with continuous glass transport, wherein the machine comprises:
a loading station receiving the glass panes to be printed
a viewing means or a mechanical positioning system downstream of a charging station; and
a printing bridge preferably arranged downstream of the viewing means or mechanical positioning system,
an unloading station allowing the unloading of the printed glass panes
wherein the machine comprises an upper level arranged above a lower level, with a series of carriages running continuously driven by linear motors travelling in one direction on the upper level and in the opposite direction on the lower level; to achieve this change of direction, a first vertical drive in the loading station raises the carriages from the lower level to the upper level and a second vertical drive in the unloading station lowers the carriages from the upper level to the lower level, and
wherein each carriage is slotted, to be integrated and coupled with a loading or unloading belt system to transfer the glass smoothly.

2. The glass printing machine with continuous glass transport according to claim 1, wherein the first and second vertical drives can be pneumatic, electric, or hydraulic, or driven by linear motors.

3. The glass printing machine with continuous glass transport according to claim 1, wherein the carriages return to the starting point of the machine, once they have been lowered, driven by a system of belts, racks, spindles, pneumatics, totally independent of the linear movement of the upper level.

4. The glass printing machine with continuous glass transport according to claim 1, wherein the number of carriages and linear motors that drive the panes will depend on the maximum length of the glass panes to be processed and the cycle times required.

5. The glass printing machine with continuous glass transport according to claim 1, wherein at the time of printing the carriages are transported with a drive that has an optical linear encoder with a resolution of less than 4 microns.

6. The glass printing machine with continuous glass transport according to claim 1, wherein on the lower level there is a cleaning station consisting of several rollers, such when each carriage passes through said cleaning station it is subjected to a cleaning process to remove any traces of paint that may have fallen on the carriage.

7. The glass printing machine with continuous glass transport according to claim 1, wherein on the lower level there are supports with quick coupling that prevent the glass from touching the table.

8. A glass printing machine with continuous glass transport, wherein the machine comprises:
- a loading station receiving the glass panes to be printed
- a viewing means or a mechanical positioning system downstream of a charging station; and
- a printing bridge preferably arranged downstream of the viewing means or mechanical positioning system,
- an unloading station allowing the unloading of the printed glass panes wherein the machine comprises an upper level arranged above a lower level, with a series of carriages running continuously driven by linear motors travelling in one direction on the upper level and in the opposite direction on the lower level; to achieve this change of direction, a first vertical drive in the loading station raises the carriages from the lower level to the upper level and a second vertical drive in the unloading station lowers the carriages from the upper level to the lower level;

each carriage is slotted, to be integrated and coupled with a loading or unloading belt system to transfer the glass smoothly;

the time of printing the carriages are transported with a drive that has an optical linear encoder with a resolution of less than 4 microns; and, on the lower level there is a cleaning station consisting of several rollers, such when each carriage passes through said cleaning station it is subjected to a cleaning process to remove any traces of paint that may have fallen on the carriage.

* * * * *